United States Patent
Liu et al.

(10) Patent No.: US 11,740,196 B2
(45) Date of Patent: Aug. 29, 2023

(54) MULTIFUNCTIONAL BIOMASS SUSPENSION DEFLAGRATION TEST-BED

(71) Applicant: Henan Agricultural University, Zhengzhou (CN)

(72) Inventors: Shengyong Liu, Zhengzhou (CN); Jiong Wang, Zhengzhou (CN); Jie Lu, Zhengzhou (CN); Xinping Liu, Zhengzhou (CN); Libin Jie, Zhengzhou (CN); Dongdong Wei, Zhengzhou (CN); Hongge Tao, Zhengzhou (CN); Chunyao Qing, Zhengzhou (CN); Li Huang, Zhengzhou (CN); Aili He, Zhengzhou (CN); Zhenzhong Wang, Zhengzhou (CN); Changzhong Ren, Zhengzhou (CN); Haigang Wang, Zhengzhou (CN); Baoguo Guo, Zhengzhou (CN); Lei Peng, Zhengzhou (CN); Miaosen Wang, Zhengzhou (CN)

(73) Assignee: Henan Agricultural University, Zhengzhou (CN)

( * ) Notice: Subject to any disclaimer, the term of this patent is extended or adjusted under 35 U.S.C. 154(b) by 166 days.

(21) Appl. No.: 17/443,961

(22) Filed: Jul. 29, 2021

(65) Prior Publication Data
US 2022/0034832 A1    Feb. 3, 2022

(30) Foreign Application Priority Data
Jul. 29, 2020    (CN) .......................... 202010744384.3

(51) Int. Cl.
*G01N 25/54*    (2006.01)

(52) U.S. Cl.
CPC .................................. *G01N 25/54* (2013.01)

(58) Field of Classification Search
None
See application file for complete search history.

(56) References Cited

FOREIGN PATENT DOCUMENTS

| CN | 101477094 A | * | 7/2009 |
| CN | 201555843 | | 8/2010 |
| CN | 104458805 | | 3/2015 |

* cited by examiner

*Primary Examiner* — Alexander A Mercado
(74) *Attorney, Agent, or Firm* — DLA PIPER LLP (US)

(57) ABSTRACT

A new multifunctional biomass suspension deflagration test-bed is provided, which includes a closed combustion chamber. An integrated temperature and pressure sensor is arranged in the combustion chamber, and a high-speed camera and a laser concentration-measuring instrument are arranged outside the combustion chamber, which can monitor suspension deflagration. A bottom of the combustion chamber is provided with a hollow mushroom-shaped dispersion nozzle with a tray. A nozzle body is provided with a gas main-flow channel at a center thereof and gas deflected-flow channels arranged around the gas main-flow channel. A mushroom-shaped baffle plate is arranged above the nozzle body. The gas main-flow channel extends upward to the mushroom-shaped baffle plate. A vent hole is formed in a portion of the mushroom-shaped baffle plate which is corresponding to the gas main-flow channel. Each gas deflected-flow channel is inclined outward from bottom to top and directed to the mushroom-shaped baffle plate.

20 Claims, 3 Drawing Sheets

MULTIFUNCTIONAL BIOMASS SUSPENSION DEFLAGRATION TEST-BED

CROSS REFERENCE TO RELATED APPLICATION

This application claims priority to Chinese Application No. 202010744384.3, filed on Jul. 29, 2020, the content of which is incorporated herein by reference in its entirety.

TECHNICAL FIELD

The present disclosure relates to the technical field of suspension combustion of biomass powder fuel, and in particular, to a new multifunctional biomass suspension deflagration test-bed.

BACKGROUND ART

At present, the research on suspension combustion of biomass powder fuel mainly focuses on the design of suspension burners and the design of suspension combustion boilers. Existing suspension burners mainly include: brick type burners, distributed heating type burners, etc. Through the research, people have found that suspension deflagration and knocking occur during the suspension combustion of biomass powder fuel. At present, existing suspension burners and suspension combustion boilers are engineering devices, which cannot test a mechanism of the influences of factors such as temperature, concentration, humidity, particle size and gravity on the suspension deflagration; and also cannot test change laws of pressure, temperature and flame, as well as propagation laws of detonation waves in a process of suspension deflagration.

The patent publication No. CN104458805A discloses a test furnace with pulverized-coal suspension combustion characteristics for a cement kiln. The furnace includes an air source system, a heat gun, an L-shaped quartz tube, a system for heating a furnace body, and a system for monitoring and acquiring a suspension furnace body temperature. The air source system provides air having a suitable pressure and flow rate. After being preheated by the heat gun, the air is introduced into the system for heating furnace body from the L-shaped quartz tube, so that the pulverized coal that is placed in is burned in a suspended state. Data that the temperature changes along with time during the pulverized coal combustion is obtained through the system for monitoring and acquiring the suspension furnace body temperature. So, a curve that the suspension combustion temperature of the pulverized coal changes along with the time is drawn, and then the combustion thermal characteristics of the pulverized coal can be evaluated according to the curve. Compared with ordinary techniques for thermal analysis of pulverized coal, in this disclosure, only about 10 minutes are taken to complete the measurement and the calculation of a to-be-tested sample when a required measurement temperature is reached and the thermal balance is reached, which is fast, convenient and has a higher accuracy. Furthermore, in this disclosure, the continuous experiments can also be performed, without cooling the temperature to the room temperature as required in the thermogravimetric analysis, thereby saving a lot of time.

The utility model announcement No. CN201555843U discloses a test device for studying combustion characteristics of pulverized coal in a suspended state. The test device includes a cylindrical barrel connected to a lower inverted conical barrel and connected to a gas pipe at a neck of the inverted conical barrel. An inverted Y-shaped feed pipe is arranged at a gas outlet at an upper end of the cylindrical barrel, and extended into a middle part of the cylindrical barrel. The inverted Y-shaped feed pipe is made of quartz. In the utility model, there exits the advantages of simple structure, reliable performance, good experiment repeatability, prolonged residence time of pulverized coal, and favorableness for the formation of a suspended state.

However, the above-mentioned disclosed technical solutions are all used to test suspension combustion at normal pressure, and cannot realize deflagration tests under pressure.

SUMMARY

An objective of the present disclosure is to provide a new multifunctional biomass suspension deflagration test-bed.

To solve the above-mentioned technical problems, the present disclosure adopts the following technical solutions.

A new multifunctional biomass suspension deflagration test-bed is provided, which includes a combustion chamber that is closed, wherein a tray is arranged at a bottom of an inside of the combustion chamber, and a hollow mushroom-shaped dispersion nozzle is arranged at the tray and is externally connected to a test gas source; the hollow mushroom-shaped dispersion nozzle includes a nozzle body, the nozzle body is provided with a gas main-flow channel located at a center thereof and gas deflected-flow channels arranged around the gas main-flow channel, a mushroom-shaped baffle plate is arranged above the nozzle body, the gas main-flow channel extends upward to the mushroom-shaped baffle plate, and a portion of the mushroom-shaped baffle plate which is corresponding to the gas main-flow channel is formed with a vent hole; each of the gas deflected-flow channels is inclined outward from bottom to top and directed towards the mushroom-shaped baffle plate; wherein gas passes through the gas deflected-flow channels and then is reflected by the mushroom-shaped baffle plate, and the gas after being reflected blows up biomass powder fuel on the tray.

The gas main-flow channel is internally provided with a thread.

The combustion chamber is of a vertical columnar structure.

A bottom plate of the combustion chamber is connected to an adjustable base, the adjustable base includes a bottom disc located below the combustion chamber, the bottom disc is provided circumferentially with a plurality of telescopic rods, the telescopic rods are combined together to form a circular truncated cone with a small upper part and a large lower part, and two ends of each of the telescopic rods are connected to the combustion chamber and the bottom disc respectively.

A capacitor ignition device is arranged in the combustion chamber; and a focusing radiant heater is arranged around sides of the combustion chamber.

An integrated temperature and pressure sensor is arranged in the combustion chamber; and the focusing radiant heater, a laser concentration-measuring instrument and/or a high-speed camera are arranged on the sides of the combustion chamber.

The test gas source includes an oxygen source and a combustible gas source, the oxygen source and the combustible gas source are connected to the nozzle body of the hollow mushroom-shaped dispersion nozzle through a gas delivery pipe.

The test gas source further includes a water vapor source, and the water vapor source is connected to the gas delivery pipe.

Gas pressure regulators are arranged at a joint of the oxygen source and the gas delivery pipe, a joint of the combustible gas source and the gas delivery pipe, and a joint of the water vapor source and the gas delivery pipe, respectively, and the gas delivery pipe is provided with solenoid valves.

A quartz tube is selected for the combustion chamber, and the quartz tube is installed on a bottom plate of the combustion chamber to form the combustion chamber that is closed; and the quartz tube is provided with an explosion-proof slice.

The present disclosure has the following beneficial effects.

1. The new multifunctional biomass suspension deflagration test-bed according to the present disclosure can test the influence of different influencing factors on suspension deflagration, and can also test change laws of pressure, temperature and flame as well as propagation laws of detonation waves in a process of suspension deflagration, so as to ascertain a mechanism of biomass suspension deflagration. In addition, the test-bed can further be used to conduct experiment on mixed combustion of biomass powder fuel and combustible gas, so as to ascertain a mechanism of mixed combustion of the biomass powder fuel and the combustible gas, which provides data support for the design of a device for mixed combustion of the biomass powder fuel and the combustible gas.

2. A hollow mushroom-shaped dispersion nozzle is provided in the present disclosure. Gas is diverged after passing through the hollow mushroom-shaped dispersion nozzle. One part of the gas passes through the gas deflected-flow channels and then is reflected by the mushroom-shaped baffle plate. Furthermore, the reflected gas blows up the biomass powder fuel on the tray to disperse the powder fuel. The other part of the gas passes through a gas main-flow channel, as well as carries with the dispersed biomass powder fuel and advances forward.

In the present disclosure, the gas main-flow channel is internally provided with a thread, which can spirally interfere in the gas and enable the dispersed biomass powder fuel that is carried to spirally move forward. So, the biomass powder fuel that spirally moves forward is evenly distributed in a combustion chamber.

3. In the present disclosure, ignition is performed by a capacitor ignition device. The capacitor ignition device can be adjusted the amount of electricity stored in a capacitor thereof, and thus ignition energy can be quantitatively tested, so as to explore the influence of the ignition energy on biomass suspension deflagration.

In the present disclosure, an integrated temperature and pressure sensor is arranged in the combustion chamber, and can measure temperatures and pressures at different positions in a determined direction. Data is collected and stored by an information acquisition device, which can be used to explore a law of temperature change and a law of pressure propagation during the suspension deflagration process.

In the present disclosure, a focusing radiant heater is arranged on the sides of the combustion chamber, and the temperature can be controlled by adjusting a current, so as to test the influence of different temperatures on biomass suspension deflagration.

In the present disclosure, a laser concentration-measuring instrument is arranged on the sides of the combustion chamber to test the degree of dispersion of the biomass powder fuel at different wind velocities; and a high-speed camera is also arranged on the sides and collects images at high frequency, which can test the flame propagation law of suspension deflagration.

4. In the present disclosure, a bottom plate of the combustion chamber is connected to an adjustable base including a bottom disc positioned below the combustion chamber. A plurality of telescopic rods are arranged circumferentially on the bottom disc. The telescopic rods are combined together to form a circular truncated cone structure with a small upper part and a large lower part. Furthermore, two ends of each of the telescopic rods are connected to the combustion chamber and the bottom disc respectively. An angle of an explosion-proof quartz tube can be adjusted through the adjustable base to test the influence of the gravity field on the distribution of biomass powder fuel, as well as the propagation law of the deflagration flame in different directions.

5. A test gas source of the present disclosure includes an oxygen source and a combustible gas source. Oxygen inflow or air inflow is controlled through a solenoid valve, and the amount of gas inflow can be adjusted to quantitatively control the ambient oxygen concentration, so that the influence of the oxygen concentration on the suspension deflagration can be tested.

The test gas source of the present disclosure further includes a water vapor source. By adjusting the amount of water vapor that is entered into the quartz tube, the ambient humidity can be changed to test the influence of humidity on suspension deflagration, so that the influence of humidity on the suspension deflagration can be explored.

6. The quartz tube is selected for the combustion chamber of the present disclosure. The quartz tube is provided with an explosion-proof slice, and the explosion-proof slice has a pressure resistance lower than that of an explosion-proof quartz tube, so as to form the explosion-proof quartz tube. When the suspension deflagration is excessively violent, the explosion-proof slice ruptures before the quartz tube explodes, so as to relieve pressure. So, the quartz tube can be prevented from exploding and safety accidents can be prevented.

DETAILED DESCRIPTION OF THE EMBODIMENTS

The specific implementations of the present disclosure will be described in detail below with reference to the accompanying drawings.

Figure 1:
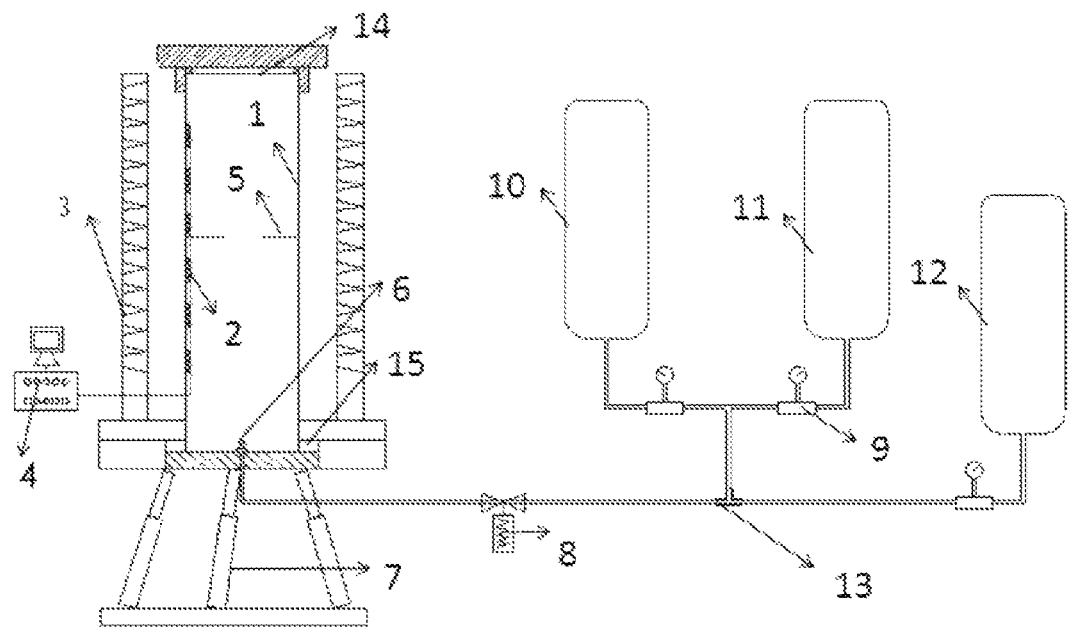
FIG. 1 is a schematic diagram according to an embodiment of the present disclosure.
Figure 2:
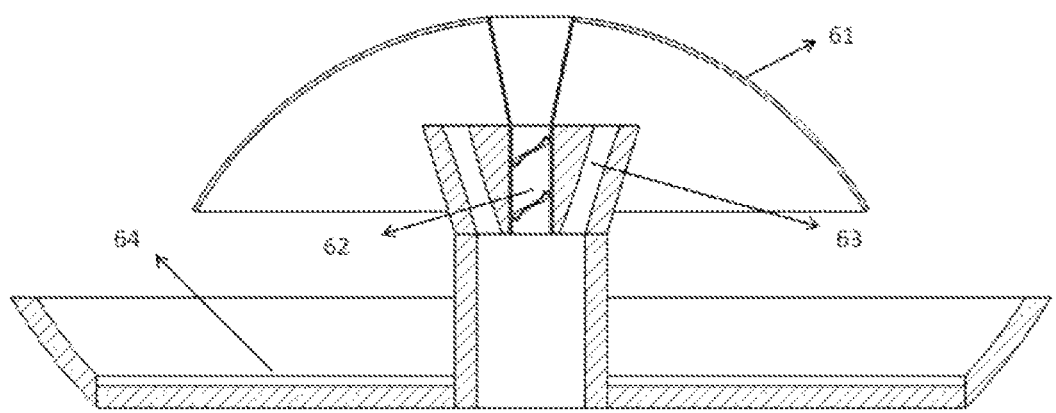
FIG. 2 is a schematic diagram of a hollow mushroom-shaped dispersion nozzle and a tray according to an embodiment of the present disclosure.
Figure 3:
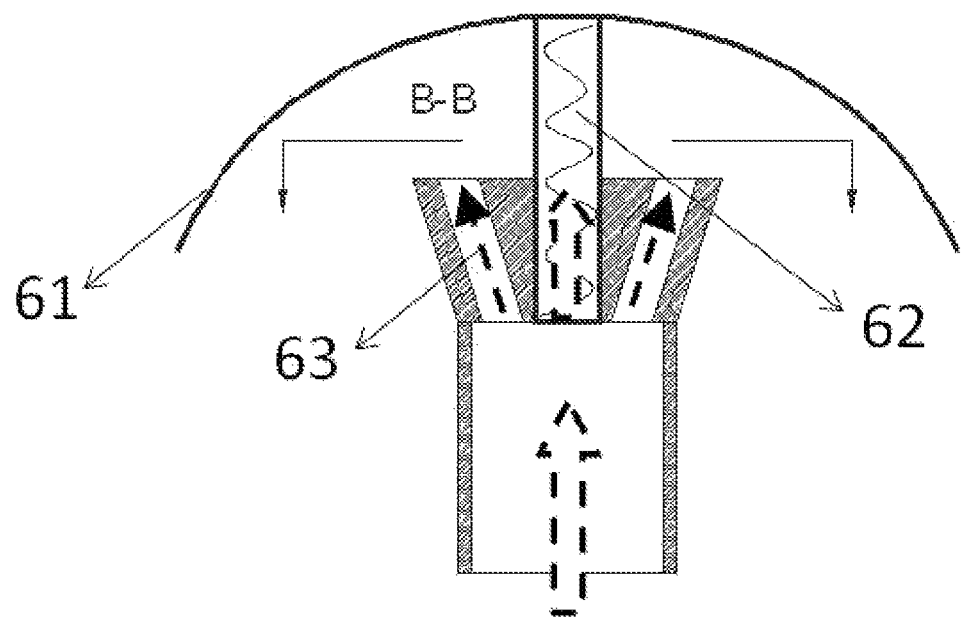
FIG. 3 is a schematic diagram of a hollow mushroom-shaped dispersion nozzle according to an embodiment of the present disclosure.
Figure 4:
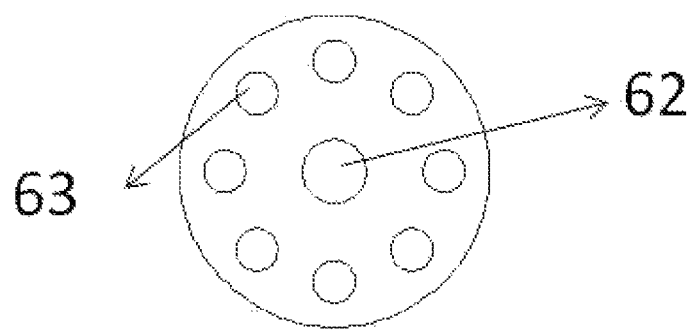
FIG. 4 is a sectional view taken along a line B-B of FIG. 3.
Figure 5:
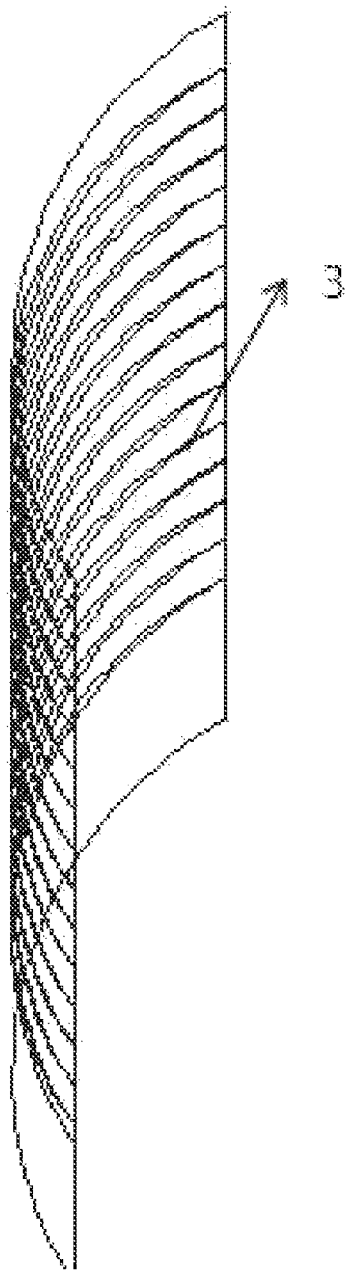
FIG. 5 is a schematic diagram of a focusing radiant heater according to an embodiment of the present disclosure.

As shown in FIG. 1 to FIG. 5, a new multifunctional biomass suspension deflagration test-bed according to the present disclosure includes a quartz tube 1. A top of the quartz tube 1 is provided with an explosion-proof slice 14, and a pressure resistance of the explosion-proof slice 14 is lower than that of the explosion-proof quartz tube, so as to form the explosion-proof quartz tube. When the suspension deflagration is excessively violent, the explosion-proof slice ruptures before the quartz tube explodes, so as to relieve pressure, thereby preventing the quartz tube from exploding and preventing safety accidents.

The quartz tube 1 is installed on a bottom plate, and the quartz tube 1 and the bottom plate are sealed via a sealing rubber gasket 15, so that a closed combustion cavity is formed in the quartz tube, thereby realizing a vertical columnar structure of the combustion chamber. A tray 64 is arranged at a bottom of an inside of the combustion chamber. A hollow mushroom-shaped dispersion nozzle 6 is arranged at the tray and is connected externally to a test gas source.

The hollow mushroom-shaped dispersion nozzle includes a nozzle body. The nozzle body is provided with a gas main-flow channel 62 at a center and gas deflected-flow channels 63 arranged around the gas main-flow channel 32. A mushroom-shaped baffle plate 61 is arranged above the nozzle body. The gas main-flow channel 62 is extended upward and connected to the mushroom-shaped baffle plate 61. A vent hole is formed in a portion of the mushroom-shaped baffle plate 61 which is corresponding to the gas main-flow channel 62. Each of the gas deflected-flow channels 63 is inclined outward from bottom to top and directed to the mushroom-shaped baffle plate 61.

Gas is diverged after passing through the hollow mushroom-shaped dispersion nozzle. One part of the gas passes through the gas deflected-flow channels 63 and then is reflected by the mushroom-shaped baffle plate 61. The reflected gas blows up the biomass powder fuel on the tray 64 to disperse the powder fuel. The other part of the gas passes through the gas main-flow channel 62, as well as carries with the dispersed biomass powder fuel and advances forward.

The gas main-flow channel 62 is internally further provided with a thread, which can spirally interfere in the gas and enable the dispersed biomass powder fuel that is carried to spirally move forward. So, the biomass powder fuel that spirally moves forward is evenly distributed in the combustion chamber.

In this embodiment, a lower part of the quartz tube 1 is connected to an adjustable base 7. The adjustable base includes a bottom disc positioned below the quartz tube 1. A plurality of telescopic rods are arranged circumstantially the bottom disc. The telescopic rods are combined together to form a circular truncated cone structure with a small upper part and a large lower part. Two ends of each of the telescopic rods are connected to the bottom disc and the bottom plate of the quartz tube 1 respectively.

In this embodiment, there are six telescopic rods to form a six-degree-of-freedom adjustable base. The angle of the explosion-proof quartz tube can be adjusted by adjusting the lengths of the telescopic rods, so as to test the influence of the gravity field on the distribution of biomass powder fuel and the propagation law of the deflagration flame in different directions.

The quartz tube 1 is internally provided with a capacitor ignition device 5. Ignition is performed by the capacitor ignition device 5. The capacitor ignition device 5 can be adjusted the amount of electricity stored in a capacitor thereof, and thus the ignition energy is quantitatively tested, so as explore the influence of the ignition energy on biomass suspension deflagration.

An integrated temperature and pressure sensor 2 is arranged in the quartz tube 1, and can measure temperatures and pressures at different positions. Data is collected and stored by an information acquisition device, which can explore a law of temperature change and a law of pressure propagation during the suspension deflagration process.

A focusing radiant heater 3 is arranged around sides of the quartz tube 1, and the temperature can be controlled by adjusting a current, so as to test the influence of different temperatures on biomass suspension deflagration.

A laser concentration-measuring instrument (including a laser transmitter of the laser concentration-measuring instrument and a laser receiver of the laser concentration-measuring instrument) is arranged on the sides of the quartz tube 1, so as to test the degree of dispersion of the biomass powder fuel at different wind speeds. A high-speed camera is further arranged on the sides. The high-speed camera collects images at high frequency. So, the flame propagation law of suspension deflagration can be tested.

In this embodiment, the test gas source includes an oxygen source 10 and a combustible gas source 11. The oxygen source 10 and the combustible gas source 11 are connected to the nozzle body of the hollow mushroom-shaped dispersion nozzle 5 through a gas delivery pipe. The test gas source further includes a water vapor source 12, and the water vapor source is connected to the gas delivery pipe through a three-way valve.

Gas pressure regulators 9 are arranged at a joint of the oxygen source 10 and the gas delivery pipe, a joint of the combustible gas source 11 and the gas delivery pipe, and a joint of the water vapor source 12 and the gas delivery pipe, respectively. The gas delivery pipe is provided with a solenoid valve 13.

During operation, oxygen inflow or air inflow is controlled through a solenoid valve 8, and the amount of the gas inflow can be adjusted to quantitatively control the ambient oxygen concentration, so that the influence of the oxygen concentration on the suspension deflagration can be tested. Moreover, by adjusting the amount of water vapor that is entered into the quartz tube, the ambient humidity can be changed to test the influence of humidity on suspension deflagration, so that the influence of humidity on the suspension deflagration can be explored.

The new multifunctional biomass suspension deflagration test-bed according to the present disclosure further includes an information acquisition device. The information acquisition device collects test information of all the integrated temperature and pressure sensor 2, the focusing radiant heater 3, the capacitor ignition device 5, the laser concentration-measuring instrument and the high-speed camera.

The working principle of the present disclosure is as follows.

After biomass powder fuel is sieved, the biomass powder fuel is divided based on the particle size thereof. Furthermore, a certain amount of biomass powder fuel with a certain particle size is weighed and placed on the tray 64 below the new hollow mushroom-shaped dispersion nozzle 6. Oxygen inflow or air inflow is controlled through a solenoid valve, and the amount of the gas inflow can be adjusted to quantitatively control the ambient oxygen concentration, so that the influence of the oxygen concentration on the suspension deflagration can be tested. Gas is diverged after passing through the new hollow mushroom-shaped dispersion nozzle 6. One part of the gas passes through the gas deflected-flow channels 63 and then is reflected by the baffle plate. The reflected gas blows up the biomass powder fuel on the tray 64 to disperse the powder fuel. The other part of the gas passes through the gas main-flow channel 62. Because the gas main-flow channel 62 is internally provided with the thread, which can spirally interfere in the gas and enable the dispersed biomass powder fuel that is carried to spirally move forward.

The biomass powder fuel that spirally moves forward is evenly distributed in the explosion-proof quartz tube, and at this time, ignition can be performed by the capacitor ignition device.

The new multifunctional biomass suspension deflagration test-bed according to the present disclosure can implement the following tests.

(1) The test-bed is arranged with the focusing radiant heater, which can test the influence of temperature on suspension deflagration.

(2) The test-bed is connected to the oxygen source, the combustible gas source and the water vapor source through the three-way valve, which can test the influence of humidity on suspension deflagration, and can also test mixed combustion of biomass powder fuel and combustible gas.

(3) The quartz tube of the test-bed is internally provided with the capacitor ignition device, which can test the influence of ignition energy on suspension deflagration.

(4) The integrated temperature and pressure sensor is arranged in the quartz tube of the test-bed, and can measure temperatures and pressures at different positions in the determined direction, so as to test temperature changes and pressure propagation during the suspension deflagration process.

(5) Telescopic support rods are installed on a side of the test-bed, and the suspension deflagration pressure and temperature propagation in different directions can be tested by adjusting the angle of the quartz tube.

(6) The test-bed is provided with the laser concentration-measuring instrument to test the degree of dispersion of biomass powder fuel at different wind speeds.

(7) The test-bed is provided with the high-speed camera, and the high-speed camera collects images at high frequency, which can test the flame propagation law of suspension deflagration.

The new multifunctional biomass suspension deflagration test-bed according to the present disclosure can test the influence of different influencing factors on suspension deflagration, and can also test change laws of pressure, temperature and flame as well as propagation laws of detonation waves in a process of suspension deflagration, so as to ascertain the mechanism of biomass suspension deflagration. In addition, the test-bed can further be used to test mixed combustion of biomass powder fuel and combustible gas, so as to ascertain a mechanism of mixed combustion of the biomass powder fuel and the combustible gas, which provides data support for the design of a device for mixed combustion of the biomass powder fuel and the combustible gas.

The above-mentioned embodiments are only used to illustrate rather than limit the technical solutions of the present disclosure. Although the present disclosure has been described in detail with reference to the above-mentioned embodiments, a person of ordinary skill in the art should understand that the present disclosure may still be modified or equivalently replaced, and any modification or partial replacement without departing from the spirit and scope of the present disclosure shall fall within the scope of the claims of the present disclosure.

In the description of the present disclosure, it should be understood that orientations or position relationships indicated by the terms "upper", "lower", "front", "rear", "left", "right", etc. are orientation or position relationships shown in the accompanying drawings, and these terms are just used to facilitate the description of the present disclosure and simplify the description, but not to indicate or imply that the mentioned device or elements must have a specific orientation and must be established and operated in a specific orientation, and thus these terms cannot be understood as a limitation to the protected content of the present disclosure.

What is claimed is:

1. A biomass suspension deflagration test-bed, the test-bed comprising a combustion chamber that is closed, wherein a tray is arranged at a bottom of an inside of the combustion chamber, and a hollow mushroom-shaped dispersion nozzle is arranged at the tray and is externally connected to a test gas source;

wherein the hollow mushroom-shaped dispersion nozzle comprises a nozzle body, the nozzle body is provided with a gas main-flow channel located at a center thereof and gas deflected-flow channels arranged around the gas main-flow channel, a mushroom-shaped baffle plate is arranged above the nozzle body, the gas main-flow channel extends upward to the mushroom-shaped baffle plate, a portion of the mushroom-shaped baffle plate which is corresponding to the gas main-flow channel is formed with a vent hole; each of the gas deflected-flow channels is inclined outward from bottom to top and directed towards the mushroom-shaped baffle plate, wherein gas passes through the gas deflected-flow channels and then is reflected by the mushroom-shaped baffle plate, and the gas after being reflected blows up biomass powder fuel on the tray.

2. The biomass suspension deflagration test-bed according to claim 1, wherein the gas main-flow channel is internally provided with a thread.

3. The biomass suspension deflagration test-bed according to claim 2, wherein a capacitor ignition device is arranged in the combustion chamber; and a radiant heater is arranged around sides of the combustion chamber.

4. The biomass suspension deflagration test-bed according to claim 3, wherein an integrated temperature and pressure sensor is arranged in the combustion chamber; and the radiant heater, a laser concentration-measuring instrument and/or a camera are arranged on the sides of the combustion chamber.

5. The biomass suspension deflagration test-bed according to claim 2, wherein the test gas source comprises an oxygen source and a combustible gas source, the oxygen source and the combustible gas source are connected to the nozzle body of the hollow mushroom-shaped dispersion nozzle through a gas delivery pipe.

6. The biomass suspension deflagration test-bed according to claim 5, wherein the test gas source further comprises a water vapor source, and the water vapor source is connected to the gas delivery pipe.

7. The biomass suspension deflagration test-bed according to claim 1, wherein the combustion chamber is of a vertical columnar structure.

8. The biomass suspension deflagration test-bed according to claim 7, wherein a capacitor ignition device is arranged in the combustion chamber; and a radiant heater is arranged around sides of the combustion chamber.

9. The biomass suspension deflagration test-bed according to claim 8, wherein an integrated temperature and pressure sensor is arranged in the combustion chamber; and the radiant heater, a laser concentration-measuring instrument and/or a camera are arranged on the sides of the combustion chamber.

10. The biomass suspension deflagration test-bed according to claim 7, wherein the test gas source comprises an oxygen source and a combustible gas source, the oxygen source and the combustible gas source are connected to the nozzle body of the hollow mushroom-shaped dispersion nozzle through a gas delivery pipe.

11. The biomass suspension deflagration test-bed according to claim 1, wherein a bottom plate of the combustion chamber is connected to an adjustable base, the adjustable base comprises a bottom disc located below the combustion chamber, the bottom disc is provided circumferentially with a plurality of telescopic rods, the telescopic rods are combined together to form a circular truncated cone structure with an upper part smaller in size than a lower part, and two ends of each of the telescopic rods are connected to the combustion chamber and the bottom disc respectively.

12. The biomass suspension deflagration test-bed according to claim 11, wherein a capacitor ignition device is arranged in the combustion chamber; and a radiant heater is arranged around sides of the combustion chamber.

13. The biomass suspension deflagration test-bed according to claim 12, wherein an integrated temperature and pressure sensor is arranged in the combustion chamber; and the radiant heater, a laser concentration-measuring instrument and/or a camera are arranged on the sides of the combustion chamber.

14. The biomass suspension deflagration test-bed according to claim 11, wherein the test gas source comprises an oxygen source and a combustible gas source, the oxygen source and the combustible gas source are connected to the nozzle body of the hollow mushroom-shaped dispersion nozzle through a gas delivery pipe.

15. The biomass suspension deflagration test-bed according to claim 1, wherein a capacitor ignition device is arranged in the combustion chamber; and a radiant heater is arranged around sides of the combustion chamber.

16. The biomass suspension deflagration test-bed according to claim 15, wherein an integrated temperature and pressure sensor is arranged in the combustion chamber; and the radiant heater, a laser concentration-measuring instrument and/or a camera are arranged on the sides of the combustion chamber.

17. The biomass suspension deflagration test-bed according to claim 1, wherein the test gas source comprises an oxygen source and a combustible gas source, the oxygen source and the combustible gas source are connected to the nozzle body of the hollow mushroom-shaped dispersion nozzle through a gas delivery pipe.

18. The biomass suspension deflagration test-bed according to claim 17, wherein the test gas source further comprises a water vapor source, and the water vapor source is connected to the gas delivery pipe.

19. The biomass suspension deflagration test-bed according to claim 18, wherein gas pressure regulators are arranged at a joint of the oxygen source and the gas delivery pipe, a joint of the combustible gas source and the gas delivery pipe, and a joint of the water vapor source and the gas delivery pipe, respectively, and the gas delivery pipe is provided with solenoid valves.

20. The biomass suspension deflagration test-bed according to claim 1, wherein a quartz tube is selected for the combustion chamber, and the quartz tube is installed on a bottom plate of the combustion chamber to form the combustion chamber that is closed; and the quartz tube is provided with an explosion-proof slice.

* * * * *